United States Patent
Reed et al.

(10) Patent No.: US 8,380,027 B2
(45) Date of Patent: Feb. 19, 2013

(54) ERASABLE ION IMPLANTED OPTICAL COUPLERS

(75) Inventors: Graham T. Reed, Godalming (GB); Renzo Loiacono, Bari (IT)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 12/777,080

(22) Filed: May 10, 2010

(65) Prior Publication Data

US 2011/0274393 A1  Nov. 10, 2011

(51) Int. Cl.
*G02B 6/34* (2006.01)
*G02B 6/26* (2006.01)

(52) U.S. Cl. ............................................ 385/37; 385/39

(58) Field of Classification Search .................. None
See application file for complete search history.

(56) References Cited

U.S. PATENT DOCUMENTS

| | | | | |
|---|---|---|---|---|
| 3,542,536 A * | 11/1970 | Sahineller et al. | ............... | 65/111 |
| 4,085,501 A * | 4/1978 | Currie | .............................. | 29/593 |
| 4,560,249 A * | 12/1985 | Nishiwaki et al. | ................ | 359/3 |
| 6,115,518 A | 9/2000 | Clapp | | |
| 6,363,097 B1 * | 3/2002 | Linke et al. | ................... | 372/102 |
| 6,516,117 B1 * | 2/2003 | Fujimaki et al. | ................. | 385/37 |
| 6,681,067 B1 * | 1/2004 | Kersey | ............................. | 385/37 |
| 6,816,648 B2 | 11/2004 | Goldstein | | |
| 2002/0176463 A1 | 11/2002 | Bullington et al. | | |
| 2003/0118271 A1 * | 6/2003 | Fujimaki | ......................... | 385/15 |

OTHER PUBLICATIONS

PCT Search Report, PCT/US2011/031773, Applicant Intel Corporation, 10 pages, mailed Jan. 2, 2012.
Headley, W. R. et al., "Future Prospects for Silicon Photonics", Proc. of SPIE, vol. 6593, pp. 66931I-1-65931I-12, 2007, See Abstract; Figures 1-3, 6; Section 2.1.
Nishi I J., et al., "Photosensitive and Athermal Glasses for Optical Channelwaveguides", Journal of Non-Crystalline Solids, vol. 326 & 327, pp. 464-471, 2003, See Abstract; Figure 7; Section 3.3.
Williams, G.V.M., et al., "Ultraviolet Induced Absorption and Bragg Grating Inscription in RbCdF3:Mn2+", Journal of Applied Physics, vol. 102, pp. 113106-1-113106-6, Dec. 6, 2007, See Abstract: Figure 2; Section I.

* cited by examiner

*Primary Examiner* — Mike Stahl
(74) *Attorney, Agent, or Firm* — Blakely, Sokoloff, Taylor & Zafman LLP

(57) ABSTRACT

Erasable ion implanted optical couplers are described. In one example a method includes implanting ions into a substrate to form a grating in a waveguide of an optical device coupling optical signals into and out of the waveguide and through the grating, and annealing the substrate to remove the grating after coupling optical signals through the waveguide.

19 Claims, 3 Drawing Sheets

ERASABLE ION IMPLANTED OPTICAL COUPLERS

FIELD

The present description relates to the field of optical circuit fabrication and test and in particular to the application of erasable input and output couplers to optical components and circuits.

BACKGROUND

Integrated photonics products include filters, add-drop multiplexers, mirrors and many other optical and photonic devices for optical telecommunications, photonic interconnects, and optical sensing. Integrated devices can be built up in layers with lower devices being built first and then more devices being built up over the lower devices. In microelectronics, the devices on lower layers can be tested before more devices are layered on. Many microelectronic designs include contact pads to allow test probes to electrically connect with a partially finished wafer. If the circuits do not perform well, they can be repaired or discarded. This avoids the waste of building up higher layers only to discover later that the circuits are defective.

In optical devices, gratings are commonly used instead of electrical contact pads to couple light in and out of an optical circuit. Etched grating couplers are often used for testing prototype photonic devices, although no standard fabrication and testing technique currently exists for integrated photonic devices.

Although etched gratings can be efficiently used to couple light in photonic devices for testing and characterization purposes, once fabricated, they are permanently embedded in an optical circuit.

Typically, an intermediate grating coupler will disconnect the optical paths on either side or reduce the efficiency at which the light propagates in the optical circuit. Since the grating is an alteration of the wafer surface, the grating must be removed physically from the wafer after device testing, or the optical pathways must be re-routed to avoid the test gratings. This limits the use of the etched gratings couplers for in line optical testing and adds expense in removing them.

Photonic and other optical devices can be mass produced on a silicon wafer using processes that are well established for microelectronics, most notably by using CMOS (Complementary Metal Oxide Semiconductor) compatible fabrication techniques based on the silicon on insulator (SOI) material system. Alternatively integrated optical devices can be made using other materials such as lithium niobate, silica and III-V processes.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Optical coupling devices, in this case gratings, traditionally fabricated by reactive ion etching, can be instead produced by ion implantation. This allows the devices to be erased by a low temperature thermal treatment after use. Erasable grating structures, for example, can be used for optical wafer scale testing and any other applications requiring rapid (or disposable) implementation of integrated reflectors (Bragg gratings) and couplers in integrated photonic devices. The erasing can be performed by annealing with heat or laser annealing. Laser annealing allows implanted gratings to be erased locally without other parts of the processed wafer being affected.

Ion implanted gratings can also be used in products for telecommunications applications and optical sensing, where etched gratings have generally been preferred. Ion implanted Bragg gratings show performance comparable to or better than equivalent etched gratings, and are potentially simpler to fabricate. In addition, the planar surface of a Bragg grating is an advantage for sensing applications and thermal tuning applications.

Erasable gratings can be applied toward optical wafer scale testing technology. By inserting gratings whenever and wherever desired during the fabrication process, analysis during manufacturing can be fast, in-line, and non-destructive. The erasable access points can be used to route light at any point on a device wafer, with a minimal alteration of the wafer surface.

As described herein, ion implanted integrated gratings are formed in silicon on insulator (SOI) and other optical circuits and devices. The gratings can later be erased by annealing. The gratings have a high potential for optical integration and can be employed in a variety of integrated photonics applications, such as optical telecommunications, optical sensing, and optical wafer scale testing. Implanted gratings can be fabricated by using established ion implantation processes. The implanted ions 5 introduce structural modifications in the silicon crystalline lattice of affected waveguides.

Ion implantation can change a crystalline silicon structure to an amorphous silicon structure. This changes the refractive index enough so that a pattern of alternating lines of crystalline and amorphous silicon can form a grating. A difference in the refractive index, n, of about 0.5 between amorphous and crystalline silicon is experienced at light wavelengths of, for example, about 1.55 µm. A periodic pattern can be transferred onto a silicon waveguide by implanting group IV ions, such as Ge ions 5, through a $SiO_2$ hardmask used as a template. Implantation of other ions to damage the silicon is also possible. For silicon, a group IV material, Ge and other group IV ions work well, but other ions can also be used. For group III-V materials such as gallium arsenide, for insulators, such as lithium niobate, or for amorphous materials, such as silica glass, other ions may produce better results.

Figure 1A:
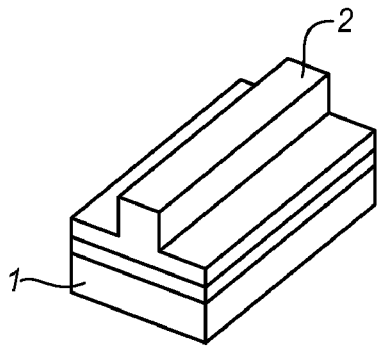
FIG. 1A is a diagram of a silicon on insulator waveguide suitable for application of the present invention.

FIGS. 1A to 1E show a schematic representation of fabricating a grating by ion implantation. Such a grating can be configured as an input or output coupler, or a Bragg grating, for example. The optical couplers can be used for wafer scale testing. FIG. 1A shows in one example a semiconductor substrate 1.

In one example, the substrate has a semiconductor layer, such as silicon, over a buried insulator layer, such as silicon dioxide, however, other materials may be used instead. A conventional optical rib waveguide 2 has been formed over the top semiconductor layer of the substrate 1 using, for example, UV photolithography techniques followed by reactive ion etching. In the illustrated example, the waveguide is a silicon rib waveguide, however other types of waveguides may alternatively be used. The optical waveguide is used for illustration purposes. A wide range of different optical devices can be represented by the simple waveguide in the example. These devices include filters, add-drop multiplexers, modulators, resonators, minors and many other waveguide based optical and photonic devices.

Figure 1B:
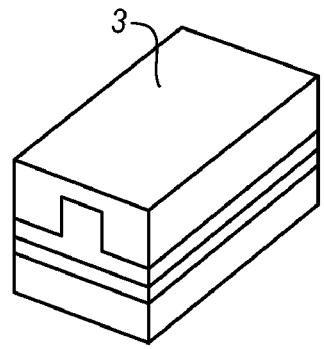
FIG. 1B is a diagram of the waveguide of FIG. 1A with a hardmask layer formed over the waveguide according to an embodiment of the invention.

FIG. 1B shows the optical waveguide with a hardmask 3 deposited over the substrate 1 including the waveguide. The hardmask 3 layer is formed over the waveguide as a layer of silicon dioxide ($SiO_2$) or silicon nitride ($Si_3N_4$), however a variety of other CMOS compatible materials may also be used, including dielectrics and metals (such as aluminum) Dielectrics may include $SiO_2$, $Si_3N_4$, SiOH, SiON, and Poly-silicon, among others. Metals may include Al, Cr, W, and Au, among others.

Figure 1C:
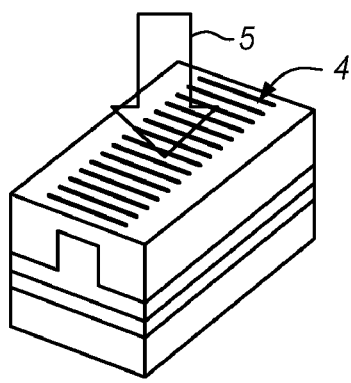
FIG. 1C is a diagram of the waveguide of FIG. 1A with ion implantation through the patterned mask according to an embodiment of the invention.

A resist layer, such as a photoresist or electron beam resist, is then patterned over the hardmask 3 in a periodic grating pattern or any other desired pattern. The resist can be deposited or spin coated, for example. It is then exposed, by electron beam lithography or deep UV lithography for example, and developed. This exposes the hardmask 3 layer in the desired pattern. The particular pattern will be determined by the particular device being fabricated. For a grating, a periodic pattern of lines can be used as shown in FIG. 1C. However, the hardmask can be used to make other patterns as well.

After the resist is patterned, the exposed areas of the hardmask 3 are etched using, for example, $CHF_3$ based gases (in the case of $SiO_2$), or other standard dielectric or metal etchants, depending on the masking material used. Typical etchants include carbon and silicon fluorine compounds, and various acids, among others. The pattern is therefore applied to the hardmask 3. The photoresist is then removed leaving a patterned hardmask 4. The particular dimensions of the pattern on the hardmask 4 can be selected to suit the particular application, such as the light to be coupled into and out of the optical components and the desired coupling efficiency.

In FIG. 1C, ions 5 are implanted through the patterned hardmask 4. The implantation can be performed using standard semiconductor processing technologies. The ions damage the underlying substrate in a pattern corresponding to the hardmask. This damage changes the refractive index of the substrate in the affected area. If the damage is great enough, then the substrate can be made to change states, for example, from crystalline to amorphous. This provides a greater change in the refractive index. The amount of ion implantation and damage to the substrate can be adapted to suit a particular application.

Figure 1D:
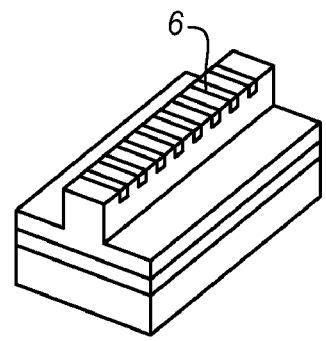
FIG. 1D is a diagram of the waveguide of FIG. 1A with a grating formed in the waveguide according to an embodiment of the invention.

In FIG. 1D, the hardmask 4 is removed by either an appropriately selective wet etching or reactive ion etching. This leaves the patterned ion implantation regions to form an optical coupler 6. The resulting optical coupler 6 can be used to couple light into and out of the waveguide or any other optical element. The optical coupler 6 provides an access point into and out of the optical components on the substrate 1 for testing and for other purposes. All of these operations are compatible with conventional CMOS (Complementary Metal Oxide Semiconductor) fabrication processes. This allows the optical coupler 6 to coexist with other electronic and photonic elements on the wafer and to be produced in the same facility and using the same equipment.

In one example, a Bragg grating is formed by the ion implantation. A Bragg grating can be used as a frequency-selective mirror. Depending on the particular application, a Bragg grating can be designed to reflect a narrow wavelength band light back into an incident optical waveguide. In this example, a Bragg grating produced as described above is erasable in the same way as an optical coupler. The particular choice of grating, optical coupler, or other optical device can be made based on the intended use for the device and the fabrication demands.

The depth of the optical coupler 6 is affected by the thickness of the amorphous regions formed by ion implantation. Heavier ions can be used at lower implantation doses and at higher implantation temperatures. On the other hand, lighter ions require higher doses and lower temperatures. Lower temperatures help to prevent self-annealing in the amorphized silicon. Self-annealing will reduce the effectiveness of the implantation process.

During the ion implantation process the substrate may be heated by the ion collisions. This creates a self-annealing effect that works against the damage intended to be caused by the ion implantation. Heavier ion species like Sn, Xe or Germanium are able to cause the desired damage at lower doses because the heavier mass in the collisions produce higher concentrations of damage. This enhances the amorphization of the material and limits self annealing.

On the other hand lighter ion species (for example Boron or Phosphorous, or even He and $N_2$) require high implantation doses and tend to self-anneal fairly easily. Furthermore, light ion species can diffuse easily into the material, making the grating profile difficult to control. The particular choice of ions for implantation will depend upon the desired effect and the fabrication equipment involved. Possible ions include Ge, Sn, Pb, Sb, Xe, noble gases in general (Ne, Ar, Kr, Xe), and Carbon, among others. For compatibility with CMOS processes, Ge and Si have been used, although other materials may also be suitable.

Ge ions 5 can be used to create amorphous zones through the hardmask 4 at relatively low doses, e.g. $10^{14}$-$10^{15}$ ions/$cm^2$. Energies between 30 keV and 70 keV and temperatures of from 300K to 700K have been used to good effect. With Ge ions 5, this has resulted in a optical coupler 6 depth of from 50 nm to 100 nm.

For typical SOI waveguide materials, it can be assumed that the material is completely amorphous when the concentration of point defects reaches a value of about $4\times10^{22}$ $cm^{-3}$. This concentration corresponds to about 80% of the crystalline silicon atomic density. Furthermore, data obtained so far shows that lower concentration values of point defects are also associated with a change in the silicon refractive index. Therefore while amorphization ensures a higher refractive index change (and thus a higher grating efficiency), it is also possible to achieve a weaker grating effect for lower damage concentrations.

Figure 1E:
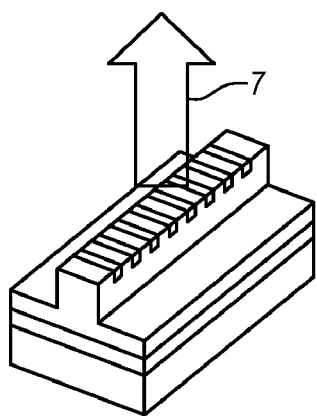
FIG. 1E is a diagram of using the grating as an optical coupler to test the waveguide or other optical components according to an embodiment of the invention.

With the optical coupler 6 or gratings in place, the wafer can be tested as suggested by FIG. 1E. In one example, the optical couplers 6 are gratings and are used as to couple light into and out of the waveguide to create entrance and exit points for the optical components on the wafer. FIG. 1E shows a grating 6 being used as an exit point. Optical signals 7 traveling through the waveguide 2 are routed in whole or in part out of the waveguide through the optical coupler 6. The signals 7 can then be sampled, measured, and evaluated for test purposes. However, the same or a different optical coupler 6 can be used as an entrance point, rather than as an exit point. Any of a variety of different tests can be performed on the optical devices on the wafer depending on the particular configuration of the optical components 2 and the optical couplers 6. The optical couplers 6 can then be erased when testing is complete.

Figure 1F:
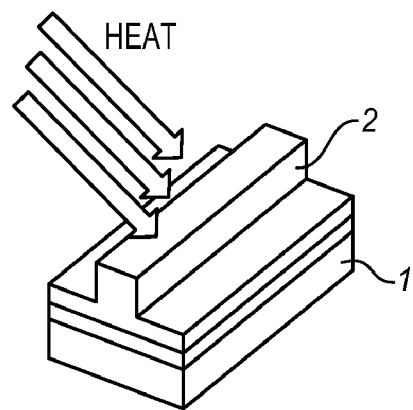
FIG. 1F is a diagram of erasing the grating from the waveguide using heat according to an embodiment of the invention.

Because the refractive index change in the implanted material is mainly related to ion implantation damage, the grating effect can be reversed. In one example, the optical coupler 6 is erased by a moderate temperature annealing of, for example, 550° C. for 15-20 minutes as shown in FIG. 1F. Other processes can be used instead of or in addition to a temperature anneal. This allows implanted optical couplers 6 to be used anywhere that an erasable optical coupler is desired. One example application for erasable gratings is for wafer scale testing of photonic devices. Integrated optical couplers can be implanted in different areas of a processed silicon wafer in order to make light coupling possible for testing purposes.

Figure 2:
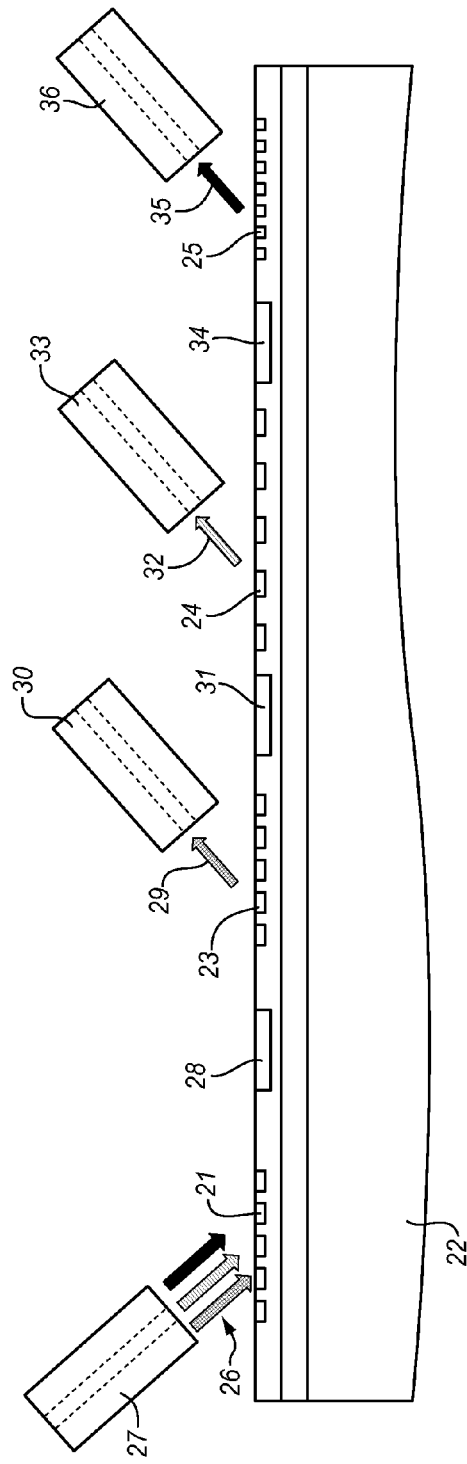
FIG. 2 is diagram of a cascaded array of gratings that can be used for testing several photonic devices according to an embodiment of the invention.

FIG. 2 shows a cascaded array of gratings that can be used for testing a photonic device. Cascaded configurations can provide for a greater range of tests for optical wafer scale testing. In FIG. 2 a higher efficiency ($\eta_i$) input coupler 21 is implanted on a device wafer 22, and the output signal is extracted at different points 23, 24, 25 in the wafer by using different gratings of various efficiencies ($\eta_1$, $\eta_2$, $\eta_3$).

In the example of FIG. 2, an optical test signal 26 is coupled into the wafer by an optical signal generator 27. The test signal propagates through one or more optical devices that constitute a first photonic device under test (PDUT1) 28. The output 29 of the first PDUT is collected in part at the first lower efficiency grating 23 by a test signal receiver 30. However only a portion of the input test signal is collected, the remaining part of the optical test signal 26 continues through a second optical device (PDUT2) 31. After processing through the second device, a portion of the test signal 32 is collected by a second test signal receiver 34.

The remaining portion of the test signal 26 continues to a third optical device (PDUT3) 34. The optical output 35 of this device can be collected at the third output grating 25 by a third test signal receiver 36. There may be additional optical devices (not shown) through which a remaining portion of the test signal 26 travels. More or fewer input and output gratings may be provided depending on the particular test regimen that is to be supported. If there are branches in the optical circuit or path, then gratings at the various branches can be used to collect portions of the test signals. The particular number of test signals and branches can be adapted to suit the particular topography of the wafer and any desired testing regimen.

In order to distinguish the testing output 29, 32, 35 for each different device, a variety of strategies can be implemented. In one example, different gratings can be implanted in different positions on the wafer by employing either different implantation depths or different grating periods. Different implantation depths can be fabricated by using different ion energies during the implantation process. Different depths and different periods allow different wavelength optical test signals to be used. This can allow for more advanced testing schemes through cascading a series of gratings.

In the illustrated example, the original test signal 26 is applied with a wide frequency range as indicated by the three differently shaded arrows in the diagram. At each output grating 23, 24, 25, only a single wavelength range is coupled by the respective grating and collected by the respective receiver 30, 33, 36. After all three output gratings, all three wavelength bands are collected. For purposes of the diagram, the entire input test signal 26 has been collected through the test process. FIG. 2 is a diagram provided for purposes of illustrating the idea of a cascaded array of gratings. The actual light frequency ranges and arrangement of gratings can be adapted to suit any particular application.

The efficiency of the gratings can be adapted to suit any particular testing application. In many cases, the signal provided from implanted couplers can be very weak and very narrow in frequency range, the purpose being to be able to detect a representation of the signal. The detected representation can then be sampled and evaluated for the signal that it carries or other characteristics. In such a case, in order to test integrated designs, the power requirement may be relatively low as long as the test signal is coupled with a satisfactory SNR (Signal to Noise Ratio) inside the waveguide or other optical device. This type of coupling allows wafer scale testing to be performed with gratings that have a very low coupling efficiency. As a result, shallow ion implantation gratings can be used to good effect in such systems, notwithstanding a lower coupling efficiency than other types of gratings.

For other applications, a much higher coupling efficiency may be desired. For an input grating this can be accommodated by providing a higher input power. Alternatively, a much deeper ion implantation grating can be used. In some instances other types of gratings or ports can be used for the few places in which high coupling efficiency is desired to support particular tests. The design of any particular grating can be adapted to suit the testing regimen.

In FIG. 1F, the optical coupler 6 is erased, returning the substrate 1 and waveguide 2 in their original condition, or near original condition. The grating can be erased using rapid thermal annealing (RTA) or laser annealing, among others. Laser annealing allows the annealing to be directed at specific locations on the wafer. This can be used to allow a particular grating to be erased without affecting any other optical circuit or device. RTA can be used for wafers in which the optical circuits are more robust and will not be affected by heating to the temperature required for the erasing process.

While FIG. 1F shows the optical coupler 6 as completely erased from the substrate 1 and waveguide 2, there may be remnants of the optical coupler 6 on the waveguide. The extent to which the optical couple is erased will depend upon the characteristics of the original ion implantation and the effectiveness of the annealing process. The optical coupler may be sufficiently removed to eliminate its function even though some of the silicon remains in an amorphous or damaged state. In addition even if virtually all of the damaged/amorphous silicon is returned to crystalline state, implanted ions may remain in the substrate. It is not necessary to completely eliminate all remnants of the optical coupler during the anneal, but instead to restore the earlier functions of the optical waveguides for use.

Figure 3:
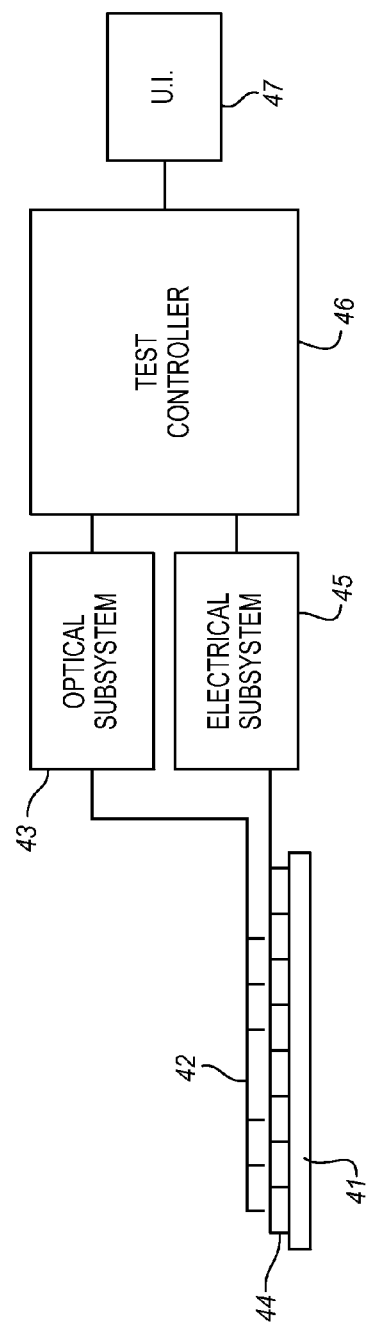
FIG. 3 is a diagram of a test system for testing photonic devices according to an embodiment of the invention.

The wafer can be tested to varying degrees depending on the application. FIG. 3 is a diagram of a test configuration for a wafer 41 that contains optical circuits or photonic elements. The wafer can be a completed wafer for final test or a partially processed wafer. The partially processed wafer can be tested and then sent to a fabrication area for further processing, sent to a rework area to be repaired, or discarded depending on the test results. The wafer is coupled to multiple optical probes 42, such as the signal generator 27 and signal receivers 30, 33, 36 of FIG. 2. For a wafer that includes multiple chips, the probes can be duplicated for each chip or for one or a few of the chips, depending on the test scenario. The optical probes can be coupled to the wafer through erasable gratings and through permanent optical couplers. This can allow for as much of the optical circuitry and devices to be tested as desired. The optical probes are coupled to an optical subsystem 43 that controls the signals generated by the signal generators and collects the signals collected by the signal receivers.

A set of electrical probes and connectors 44 are also coupled to electrical connection pads and contacts on the wafer to provide drive and modulation signals to the wafer if desired. The electrical probes can drive electronic components on the wafer, if any, provide control signals to the wafer, and provide modulation and switching signals, depending on the particular components on the wafer and the types of tests to be performed. The electrical probes and connectors are coupled to an electrical subsystem 45.

The optical and electrical subsystems are coupled to a test controller 46 which may be in the form of a specific or general purpose computer to control the tests. The testing controller provides signal sequences and receives results from the subsystems. The testing controller can then provide results to a user interface or production control system 47. A2

Figure 4:
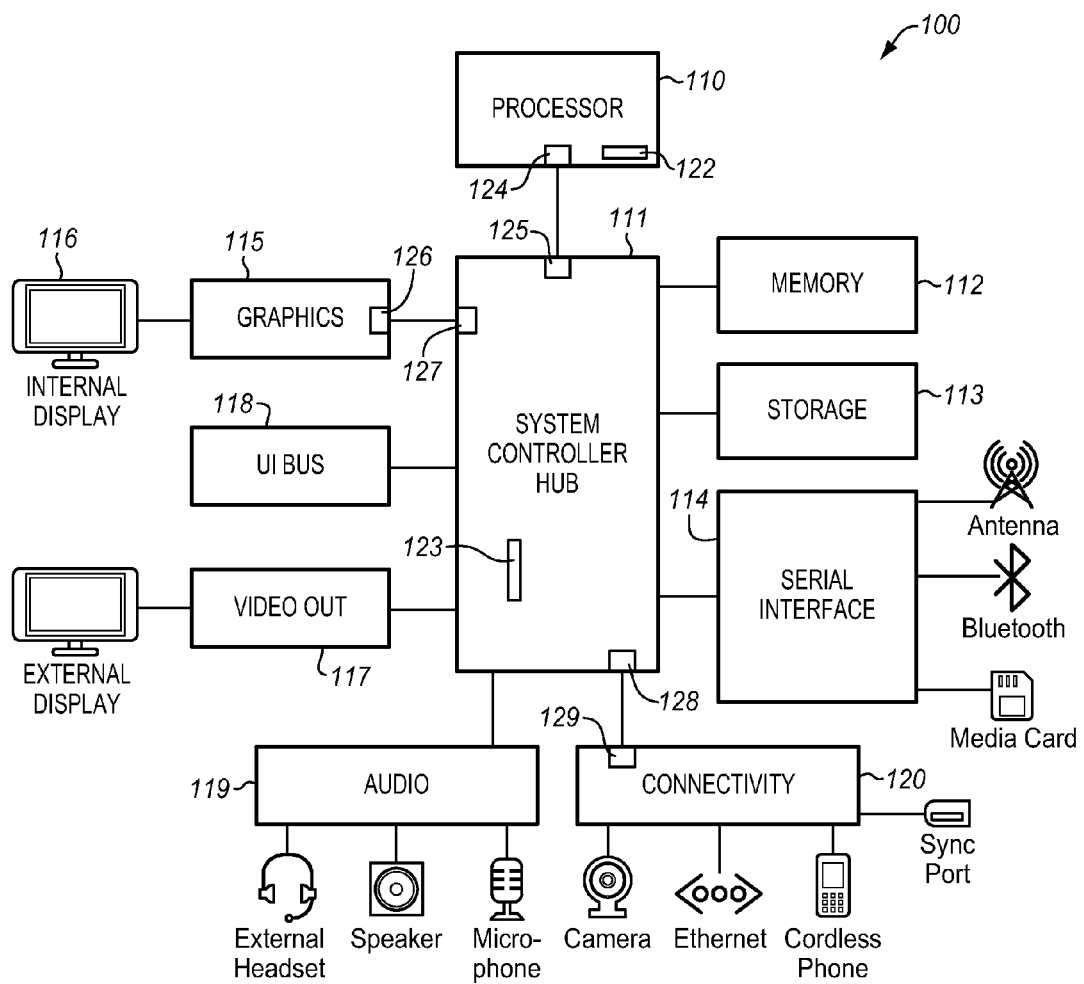
FIG. 4 is a diagram of a mobile communications device including photonic devices according to an embodiment of the invention.

FIG. 4 is an example of a device suitable for use with a microelectronic device as described above. In the example of FIG. 4, the device 100 is optimized for use as a mobile telephone, portable game console, or mobile internet device, however, the architecture can be adapted for use as a table, notebook, or desktop computer, depending on power supply, housing and user interface design, among other factors. In FIG. 4a processor 110 is coupled to a system controller hub 111.

The system controller hub has interfaces to a wide range of different devices. On one side internal high speed memory 412, such as SDRAM (Synchronous Dynamic Random Access Memory) is coupled to a first memory interface. High capacity memory 413, such as disk drive, flash, or non-volatile memory is coupled to a second memory interface. A serial interface 414 is coupled to the system controller hub to support cellular, wireless network, and peripheral device radios as well as any other serial devices, such as media cards, memory cards and other adapter cards.

The system controller hub 411 also is coupled to a graphics adapter 415 that connects to an internal display 416. For a portable device, this may be a touch screen display of any of a variety of types. A second graphics adapter 417 can be coupled to the system controller hub to provide a video output for an external display. The second graphics adapter can be combined with the first graphics adapter to reduce cost or it can be provided simply as a interface adapter without pixel processing capabilities. A User Interface bus 418 allows any of a variety of low pin count input/output interfaces to be connected to the system controller hub 411. This might include a touch screen controller, a keyboard, an infrared transceiver, etc.

The system controller hub also includes an analog audio interface 119 for microphones, speakers, headsets, etc. Finally a high speed connectivity interface 120 can be connected to the system controller hub to support high speed external interfaces such as PCI (Peripheral Component Interface), USB (Universal Serial Bus), Firewire, Light Peak, etc. This connectivity can be used for synchronizing as well as for cameras voice and video telephones, wired or wireless high speed networking and other purposes. A variety of different high speed adapters and accelerators can also be coupled to the interface.

The particular connections, interfaces, and devices illustrated are provided as examples, more or fewer may be used and the specific examples illustrated can be changed to suit particular regional and use applications. The illustrated architecture provides one example, however, certain devices can be combined or separated, depending on the application. For example, graphics, memory and some of the interfaces can be incorporated into either the system controller hub or the processor. The processor can be configured to communicate directly with graphics, memory, high speed external interfaces and other components. In addition more components can be added to suit particular applications.

Any one or more of the illustrated components may include a silicon on insulator optical waveguide as described above. For example, the processor 110 may include an internal waveguide 122 to communicate between different portions of the processor, for example between an execution core and a data or instruction cache. The system controller hub 111 may include an internal waveguide 123 to communicate between different interfaces or busses. In each case the waveguide connects two optical devices (not shown) together which may simply be optoelectric interfaces or may affect the light directly.

In addition, optical waveguides may be used to communicate between discrete components of the system. FIG. 4 shows waveguides 124,125 on the processor and hub, respectively to support an optical connection between the two devices. Similarly waveguides 126, 127 are used to couple the graphics adapter 115 to the hub 111. If the graphics adapter is incorporated into the processor or hub, an optical waveguide may still be used to connect it to other portions of the single chip. Other components may also be coupled using optical connectors. FIG. 4 also shows an optical connection between facing on-die waveguides 128, 129 to connect the hub to the high speed connectivity bus 120. The particular use and configuration of optical waveguides within the system 100 can be adapted to suit a wide range of applications and environments.

In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to an example, "one embodiment" or "an embodiment" means that a particular feature, structure, or characteristic described in connection with the embodiment is included in at least one embodiment of the present invention. Thus, appearances of such phrases in this specification do not necessarily all refer to the same embodiment. Furthermore, the particular features, structures, or characteristics may be combined in any suitable manner in one or more embodiments.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   implanting ions into a substrate to form a grating in a waveguide of an optical device;
   coupling optical signals into and out of the waveguide and through the grating; and
   annealing the substrate to remove the grating after coupling optical signals through the waveguide.

2. The method of claim 1, further comprising fabricating the optical device as a silicon on insulator optical device.

3. The method of claim 1, wherein implanting ions comprises forming a hardmask on the substrate using photolithography and implanting ions through the hardmask.

4. The method of claim 1, wherein implanting ions comprises implanting heavy group IV ions into the substrate in a pattern.

5. The method of claim 4, wherein implanting ions comprises implanting ions at a temperature below a self-annealing temperature of the substrate.

6. The method of claim 1, wherein implanting ions comprises implanting germanium ions to form a grating of periodic variations in index of refraction in the substrate, the substrate being formed of silicon on insulator.

7. The method of claim 1, wherein implanting ions comprises implanting ions to form a Bragg grating.

8. The method of claim 6, wherein implanting ions comprises changing at least a portion of the substrate from a crystalline state to an amorphous state through the ion implantation.

9. The method of claim 8, wherein removing the grating comprises changing the amorphous portions of the substrate to at least a partially crystalline state.

10. The method of claim 6, wherein implanting ions comprises introducing radiation damage in order to change the refractive index of the substrate.

11. The method of claim 7, wherein forming a grating comprises forming an optical coupler to couple light into the waveguide.

12. The method of claim 11, wherein coupling optical signals comprises testing the optical device using the coupled optical signals.

13. The method of claim 1, further comprising forming a plurality of gratings on the substrate coupled to a plurality of different optical devices on the substrate, the different gratings having different optical properties to couple different wavelengths out of the substrate.

14. The method of claim 1, further comprising forming additional optical devices over the optical device after removing the grating.

15. The method of claim 1, wherein the grating is
   an optical coupler temporarily formed on the substrate for testing and then removed by annealing, the optical coupler being coupled to the optical device for testing the optical device.

16. The method of claim 10, wherein the grating is temporarily formed by damaging the substrate in a periodic pattern.

17. The method of claim 1, further comprising forming
   a second optical device on the substrate wherein the
   waveguide couples the first and second optical device and
   the grating is
   temporarily formed on the substrate for testing and then erased after testing, the grating being coupled to the optical waveguide to couple external optical test signals out of the waveguide.

18. The method of claim 17, further comprising forming a second optical coupler to couple the external optical signals into the first optical device.

19. The method of claim 18, further comprising:
   forming a third optical device;
   forming a second optical waveguide between and coupling the second and third optical device; and
   forming a third optical coupler coupled to the second optical waveguide to couple external optical signals from the second optical coupler out of the second waveguide,
   wherein the first optical coupler couples only a portion of the external optical signals out of the waveguide.

* * * * *